(12) United States Patent
Aubert Capella

(10) Patent No.: US 6,654,069 B2
(45) Date of Patent: Nov. 25, 2003

(54) FRAME WITH A MOUNTING PLATE FOR ELECTRICAL DEVICES

(75) Inventor: Joaquin Aubert Capella, Barcelona (ES)

(73) Assignee: Simon, S.A., Barcelona (ES)

( * ) Notice: Subject to any disclaimer, the term of this patent is extended or adjusted under 35 U.S.C. 154(b) by 0 days.

(21) Appl. No.: 09/933,624

(22) Filed: Aug. 21, 2001

(65) Prior Publication Data

US 2002/0096983 A1 Jul. 25, 2002

(30) Foreign Application Priority Data

Jan. 19, 2001 (ES) .......................................... 200100129

(51) Int. Cl.$^7$ ................................................ H04H 5/64
(52) U.S. Cl. .................................... 348/840; 312/265.6
(58) Field of Search ................................ 348/836, 840, 348/794; 349/58; 174/53, 57, 61; 312/7.2, 265.6; 361/681; 40/661, 158, 159, 662, 732, 735, 781, 799

(56) References Cited

U.S. PATENT DOCUMENTS

| | | | | |
|---|---|---|---|---|
| 3,973,344 A | * | 8/1976 | Frankel | ....................... 40/706 |
| 4,367,467 A | * | 1/1983 | Emile, Jr. | .............. 340/815.53 |
| 4,584,786 A | * | 4/1986 | Georgopulos | ................ 40/448 |
| 4,599,485 A | * | 7/1986 | Smolik | ........................ 174/57 |
| 4,614,406 A | * | 9/1986 | Motoi | ........................ 345/204 |
| 4,758,687 A | * | 7/1988 | Lathrop | ....................... 174/53 |
| 5,186,566 A | * | 2/1993 | Cameron | ...................... 402/79 |
| 5,299,017 A | * | 3/1994 | Furuno | ........................ 348/786 |
| 5,317,449 A | * | 5/1994 | Furuno et al. | .............. 359/443 |
| 5,570,267 A | * | 10/1996 | Ma | .............................. 349/58 |

* cited by examiner

Primary Examiner—Lanna Mai
Assistant Examiner—Jerry A. Anderson
(74) Attorney, Agent, or Firm—Michael J. Striker

(57) ABSTRACT

A frame assembly for electrical devices for covering an area where a device is to be located includes a substantially rectangular frame having frame openings, a substantially rectangular mounting plate having plate openings corresponding to the frame openings, and the frame being socketed with the mounting plate by latches provided on a lower edge of the frame and cooperating with holes provided on the mounting plate.

1 Claim, 3 Drawing Sheets

FRAME WITH A MOUNTING PLATE FOR ELECTRICAL DEVICES

BACKGROUND OF THE INVENTION

The present invention relates to a frame with a mounting plate designed to be applied to electrical devices, such as switches, push buttons, socket bases and the like.

Electrical power systems in general and more particular domestic, commercial and industrial electrical power systems for low voltage require elements which allow, in electrical power systems with their ducts preferably embedded, to cover the location area of the above mentioned electrical devices, such as switches, push buttons, socket beds, etc., so that the periphery of the electrical devices is perfectly deliminited and protected. If the element used for this purpose, in addition, allows to provide the assembly with a distinctive or decorative signalling, a larger range of possibilities should be available for it through the chromatic variation by matching colors, in which the elements are produced.

SUMMARY OF THE INVENTION

Accordingly, it is an object of the present invention to provide a frame mounting plate which is a further improvement of the existing solutions.

In keeping with these objects and with others which will become apparent hereinafter, one feature of present invention resides, briefly stated, in a frame assembly in which a frame is socketed with a mounting plate by latches of the frame cooperating with holes of the mounting plate. The assembly in accordance with the present invention can be immediately assembled by simply pressing of its parts and also brings the possibility of color matching for signal or decorative purposes.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
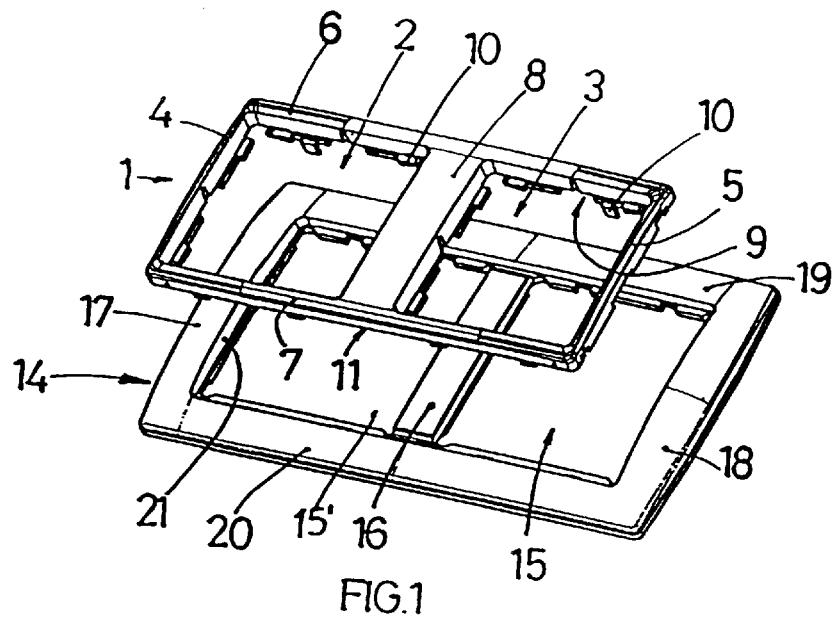
FIG. 1 is a perspective view of a frame and the mounting plate in accordance with the present invention, before their assembly.

An assembly of the present invention includes a frame which has a rectangular periphery and two identical quadrangular openings 2 and 3 which are arranged symmetrically to a central upright axis. The frame includes two shortest upright sides 4 and 5 which are identical and have slightly curved top faces, and two longest horizontal sides 6 and 7 which have different thicknesses, with the thickest one located at the top of FIGS. 1 and 2. The separating area or partition with a smooth face 8 is provided between the openings 2 and 3 and has a slightly curved face identical to the curve of the two upright sides 4 and 5. The upright sides, the horizontal sides and the partition 8 separating the openings form a continuous surface with the above mentioned curve in direction from one horizontal side 6 to the other horizontal side 7.

The frame 1, on the lower face of its periphery, along the flange which is limited by the lower part of the openings 2 and 3, has a series of rims and protuberances. They are important for locating and locking the body of the corresponding electrical device which is not shown in the drawings.

The external flange 11 of the frame 1 is less high and has a series of rims 12 with outwardly open latches 13. They allow assembling with the mounting plate 14 by simple pressing. The mounting plate 14 is rectangular. In its central part it has two rectangular openings 15 and 15' which have the dimensions corresponding to the outer dimensions of the periphery of the frame 1.

The openings 15, 15' of the mounting plate 14 are equal and symmetrical with respect to an upright central axis occupied by a smooth area 16 which is slightly lower that the top face of the mounting plate and has a width corresponding to the internal width of the central partition 8 of the frame 1.

The plate 14 has two upright sides 17 and 18 which are equal and symmetrical, the same as the area corresponding to the top face of the mounting plate 14. It has further two horizontal sides 19 and 20 having different width, with the lower side 20 being the widest to offset the difference of width of the horizontal sides 6 and 7 of the frame 1. The offset of this difference allows that the theoretical longitudinal axis of the openings 2 and 3 of the frame 1 coincides with the longitudinal axis of the assembly.

In order to assemble the frame 1 with the mounting plate 4, the frame 1 is located on the openings 15, 15' of the mounting plate 14, and the partition 8 of the frame is pressed so that the partition 8 fits on the central area of the mounting plate while the whole periphery of the lower flange 11 of the frame 1 remains perfectly socketed within and against the top of the internal wall 21 of the openings 15, 15', while the rims 12 of the frame 1 on the flange 11 remain socketed within the related holes 22 of the mounting plate, with the latches 13 locking both parts together so as to prevent their accidental release from one another.

When the frame 1 and the mounting plate 14 are assembled, the top surface of the assembly has a slight curve, perfectly continuous, along the horizontal sides and the transverse sides of the mounting plate.

As can be seen from the drawings, the mounting plate 14 is provided on its lower face with a series of ribs 23. The ribs reinforce the structure.

Figure 2:
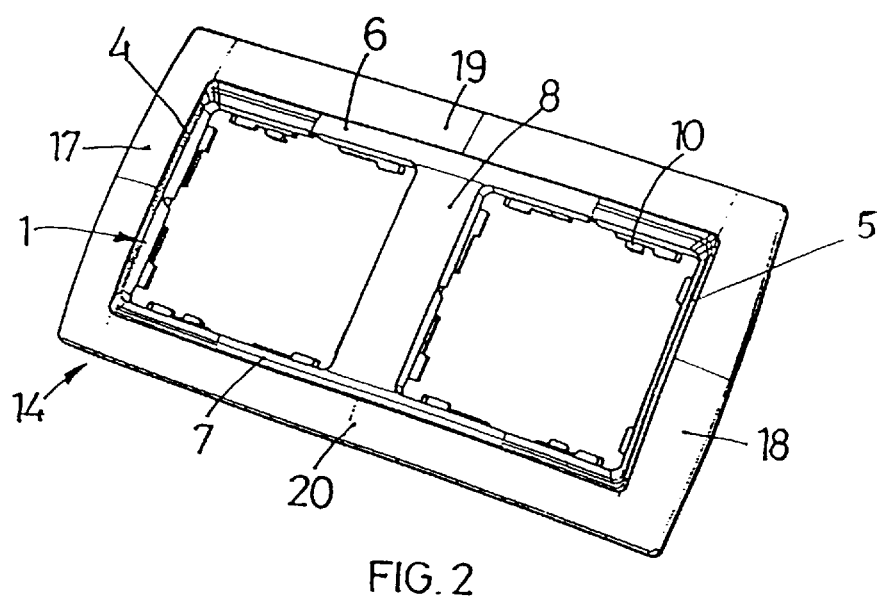
FIG. 2 is an overall view of the assembly in accordance with the present invention.
Figure 3:
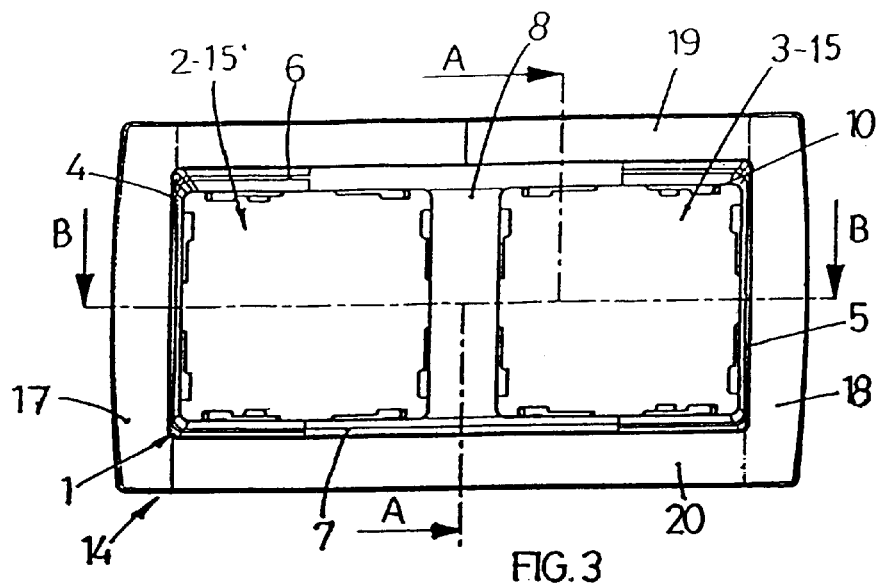
FIG. 3 is a top plan view of the assembly in accordance with the present invention.
Figure 4:
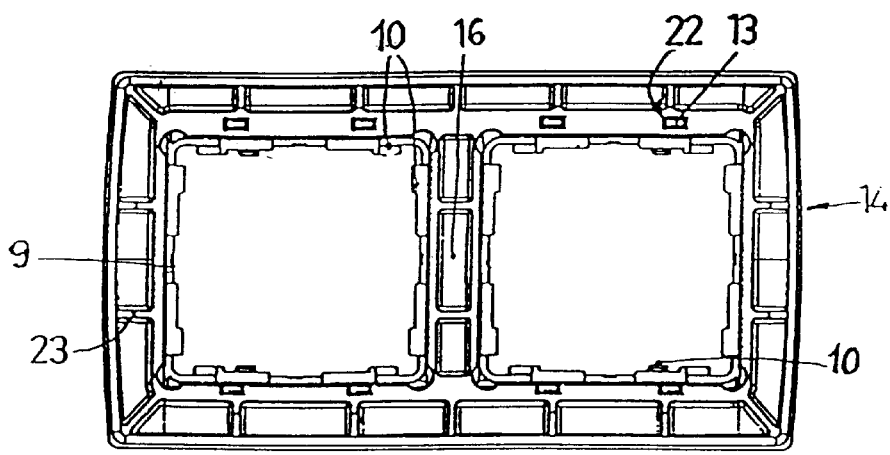
FIG. 4 is a bottom view of the assembly in accordance with the present invention.
Figure 5:
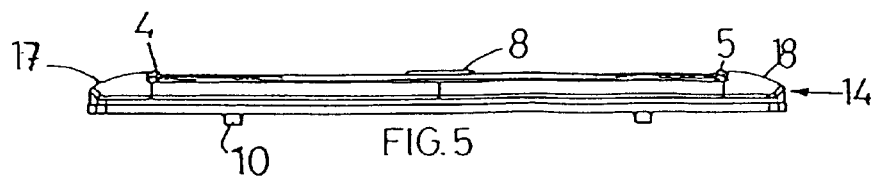
FIG. 5 is a side elevational view of the assembly in the longitudinal direction.
Figure 6:
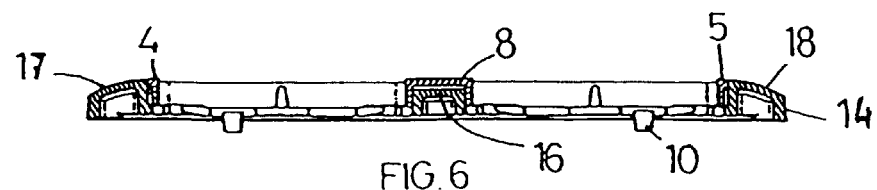
FIG. 6 is a sectional view of the assembly of the previous figure taken along the axis B—B.
Figure 7:
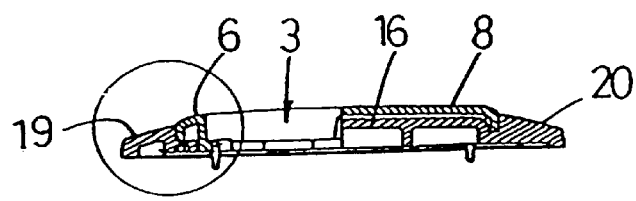
FIG. 7 is a sectional view of the assembly taken along the axis A—A.
Figure 8:
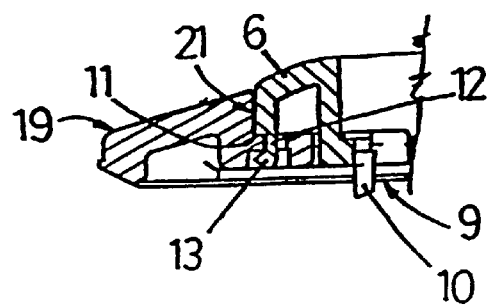
FIG. 8 is a larger scale sectional detail of assembly and locking the frame and the bottom plate.
Figure 9:
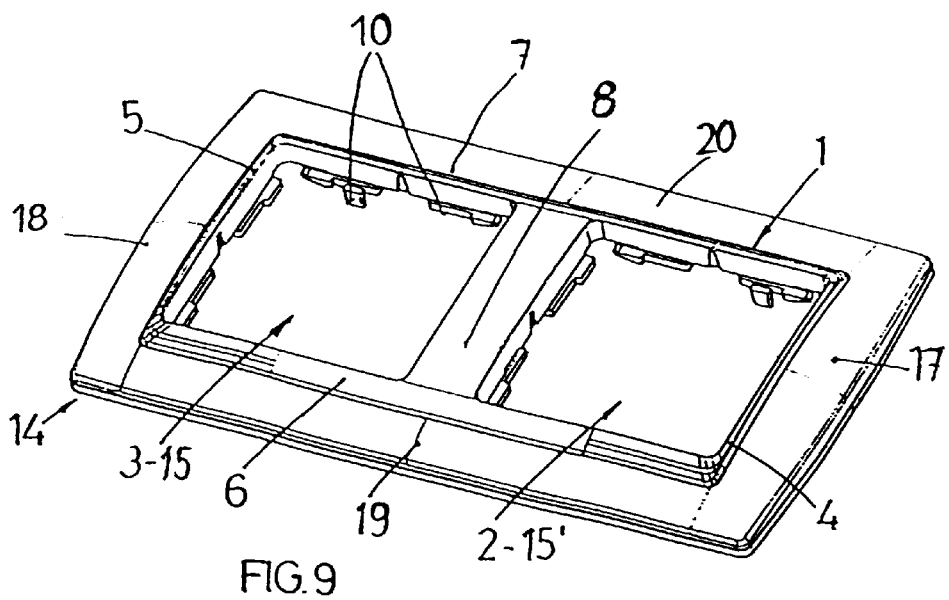
FIG. 9 is a perspective view of the assembled assembly turned by 180° with respect to the view of FIG. 2 and in a slightly more inclined position.

When the frame and the mounting plate 14 are assembled with one another, then as can be seen from FIGS. 2 and 9 the whole top face of the assembly including the sides 4, 5, 6, 7 of the frame with the partition 8, and the mounting plate 14 with the sides 17 is perfectly continuous, with the surface slightly curved.

The both components can be injection-molded of thermoplastic material, and provided with a given color base, with visible area having an even or equal color, or so that different colors are on the top face of the mounting plate and on the sides and central area of the frame. This can be used for a given chromatic signal or for a given decorative feature.

It will be understood that each of the elements described above, or two or more together, may also find a useful application in other types of constructions differing from the types described above.

While the invention has been illustrated and described as embodied in frame with a mounting plate for electrical devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A frame assembly for electrical devices for covering an area where a device is to be located, the frame assembly comprising a substantially rectangular frame having frame openings; a substantially rectangular mounting plate provided with plate openings corresponding to said frame openings, said frame being socketed with said mounting plate by latches provided on a lower edge of said frame and cooperating with holes provided in said mounting plate, said frame having horizontal sides having different widths, said mounting plate also having horizontal sides having different widths to offset a difference in the widths of said horizontal sides of said frame, so that when said frame is socketed on said mounting plate a horizontal axis of said frame openings coincides with a longitudinal axis of the frame assembly for centering the electrical devices.

* * * * *